United States Patent
Barrick et al.

(10) Patent No.: US 10,545,765 B2
(45) Date of Patent: Jan. 28, 2020

(54) MULTI-LEVEL HISTORY BUFFER FOR TRANSACTION MEMORY IN A MICROPROCESSOR

(71) Applicant: INTERNATIONAL BUSINESS MACHINES CORPORATION, Armonk, NY (US)

(72) Inventors: Brian D. Barrick, Pflugerville, TX (US); Steven J. Battle, Austin, TX (US); Joshua W. Bowman, Austin, TX (US); Hung Q. Le, Austin, TX (US); Dung Q. Nguyen, Austin, TX (US); David R. Terry, Austin, TX (US); Albert J. Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 15/597,394

(22) Filed: May 17, 2017

(65) Prior Publication Data
US 2018/0336037 A1 Nov. 22, 2018

(51) Int. Cl.
*G06F 9/38* (2018.01)
*G06F 9/30* (2018.01)
(Continued)

(52) U.S. Cl.
CPC .......... *G06F 9/3861* (2013.01); *G06F 9/3004* (2013.01); *G06F 9/30098* (2013.01);
(Continued)

(58) Field of Classification Search
CPC ........ G06F 9/467; G06F 9/528; G06F 9/3861; G06F 9/30098; G06F 9/3863; G06F 9/46; G06F 9/52; G06F 9/30116
See application file for complete search history.

(56) References Cited

U.S. PATENT DOCUMENTS

| 6,988,183 B1 | 1/2006 | Wong |
| 7,689,812 B2 * | 3/2010 | Abernathy ............ G06F 9/3802 712/216 |

(Continued)

FOREIGN PATENT DOCUMENTS

WO 2015173674 A1 11/2015

*Primary Examiner* — Benjamin P Geib
*Assistant Examiner* — Courtney P Carmichael-Moody
(74) *Attorney, Agent, or Firm* — Patterson + Sheridan, LLP

(57) ABSTRACT

Embodiments include systems, methods, and computer program products for using a multi-level history buffer (HB) for a speculative transaction. One method includes after dispatching a first instruction indicating start of the speculative transaction, marking one or more register file (RF) entries as pre-transaction memory (PTM), and after dispatching a second instruction targeting one of the marked RF entries, moving data from the marked RF entry to a first level HB entry and marking the first level HB entry as PTM. The method also includes upon detecting a write back to the first level HB entry, moving data from the first level HB entry to a second level HB entry and marking the second level HB entry as PTM. The method further includes upon determining that the second level HB entry has been completed, moving data from the second level HB entry to a third level HB entry.

20 Claims, 8 Drawing Sheets

(51) Int. Cl.
  *G06F 9/42* (2006.01)
  *G06F 9/46* (2006.01)
  *G06F 9/52* (2006.01)

(52) U.S. Cl.
  CPC ............ *G06F 9/30116* (2013.01); *G06F 9/46* (2013.01); *G06F 9/467* (2013.01); *G06F 9/528* (2013.01)

(56) References Cited

U.S. PATENT DOCUMENTS

| | | |
|---|---|---|
| 7,793,078 B2 | 9/2010 | Elwood et al. |
| 2007/0106885 A1* | 5/2007 | Rychlik .............. G06F 9/30101 712/228 |
| 2009/0217013 A1* | 8/2009 | Caprioli .............. G06F 9/30123 712/228 |
| 2011/0125968 A1* | 5/2011 | Kessler .............. G06F 11/1666 711/123 |
| 2011/0283096 A1* | 11/2011 | Abernathy .......... G06F 9/30138 712/245 |
| 2011/0296148 A1* | 12/2011 | Cain, III ............. G06F 9/30087 712/228 |
| 2014/0281267 A1* | 9/2014 | McKenney ......... G06F 12/0828 711/141 |
| 2016/0378501 A1 | 12/2016 | Le et al. |

* cited by examiner

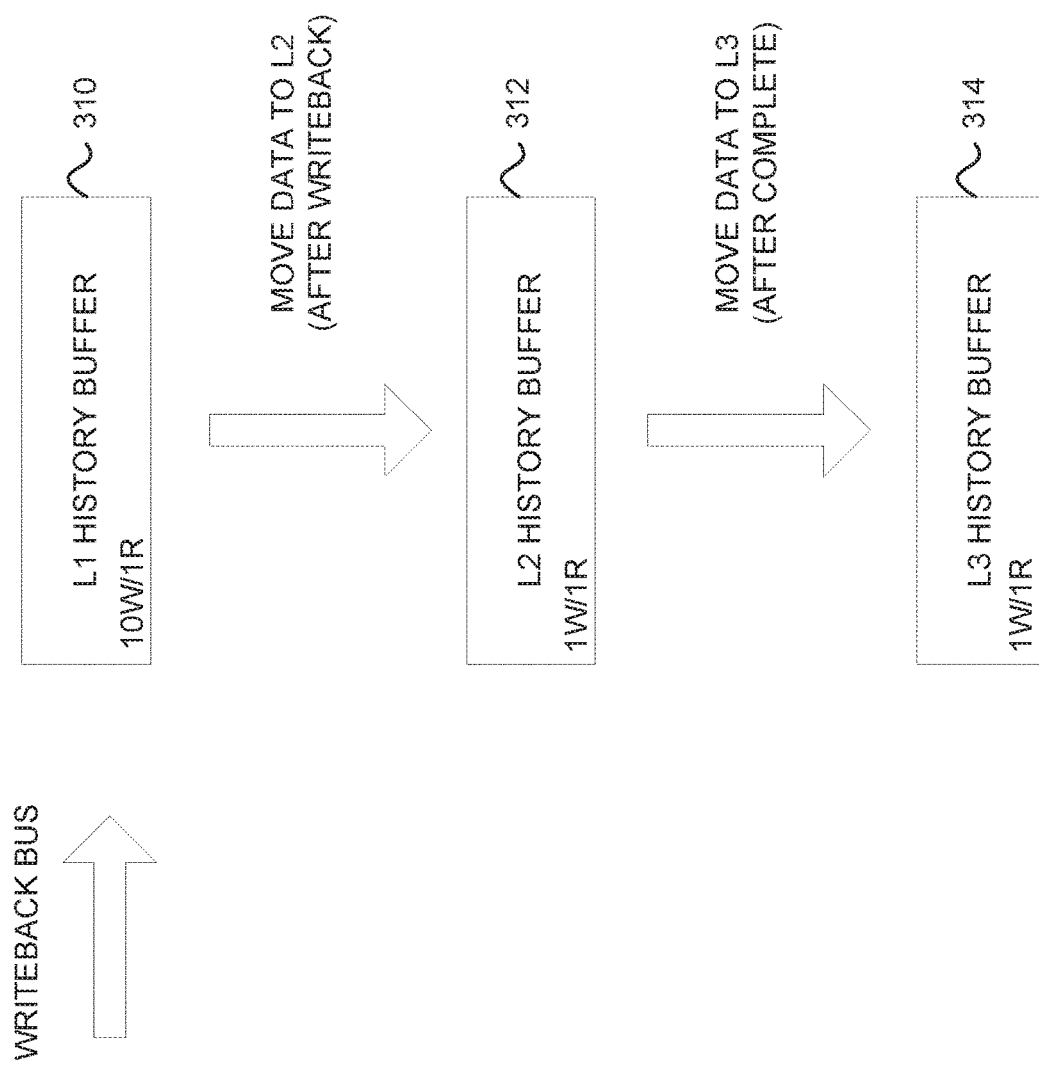

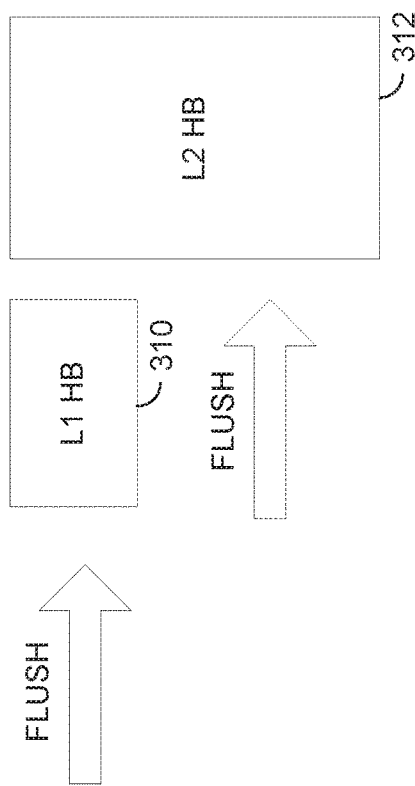
FIGURE 6A
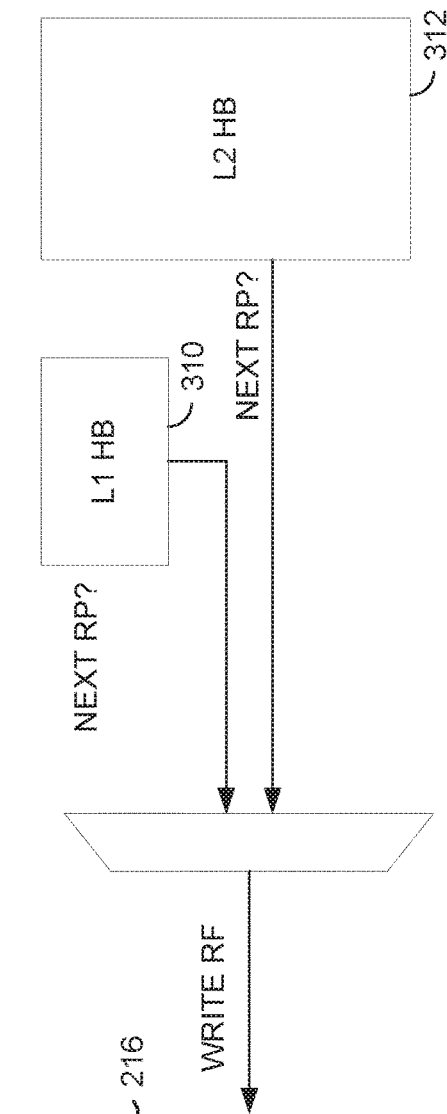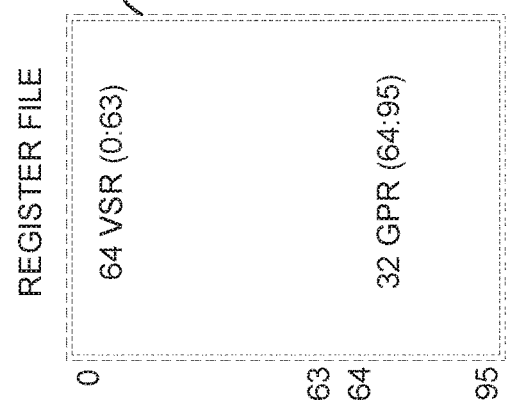
FIGURE 6B

MULTI-LEVEL HISTORY BUFFER FOR TRANSACTION MEMORY IN A MICROPROCESSOR

BACKGROUND

The present disclosure generally relates to data processing systems, and more specifically, to a multi-level history buffer design for managing speculative transactions (e.g., transaction memory) in a processing unit.

In speculative parallelization systems, also known as thread-level speculation (TLS) or multi-scalar systems, a compiler, runtime system, or programmer may divide the execution of a program among multiple threads, i.e. separately managed sequences of instructions that may execute in parallel with other sequences of instructions (or "threads"), with the expectation that those threads will usually be independent, meaning that no thread will write data that other threads are reading or writing concurrently. Due to the difficulty in statically determining the memory locations that will be accessed by threads at compilation time, this expectation is not always met. The parallel threads may actually make conflicting data accesses. Such parallelization systems use speculative execution to attempt to execute such threads in parallel. It is the responsibility of the system to detect when two speculative threads make conflicting data accesses, and recover from such a mis-speculation.

Each parallel thread corresponds to a segment of the original sequential code, and the parallel threads are therefore ordered with respect to one another according to their sequence in the sequential version of code. It is the responsibility of the system to ensure that the results of a speculative thread are not committed until all prior speculative threads in this sequence are known to be free of conflicts with the committing thread. Once it has been determined that the thread does not conflict with any threads in the prior sequence, and prior threads have committed, that thread may commit.

Systems that support transactional memory typically include a subset of the requirements of a system that supports speculative parallelization. Transactional memory attempts to simplify concurrent or parallel programming by allowing a group of load and store instructions to execute in an atomic manner, i.e. it is guaranteed that either (1) all instructions of the transaction complete successfully or (2) no effects of the instructions of the transactions occur, i.e. the transaction is aborted and any changes made by the execution of the instructions in the transaction are rolled-back. In this way, with atomic transactions, the instructions of the transaction appear to occur all at once in a single instant between invocation and results being generated.

Hardware transactional memory systems may have modifications to the processors, caches, and bus protocols to support transactions or transaction blocks, i.e. groups of instructions that are to be executed atomically as one unit. Software transactional memory provides transactional memory semantics in a software runtime library with minimal hardware support. Transactional memory systems seek high performance by speculatively executing transactions concurrently and only committing transactions that are non-conflicting. A conflict occurs when two or more concurrent transactions access the same piece of data, e.g. a word, block, object, etc., and at least one access is a write. Transactional memory systems may resolve some conflicts by stalling or aborting one or more transactions. Transactional blocks are typically demarcated in a program with special transaction begin and end annotations. Transactional blocks may be uniquely identified by a static identifier, e.g., the address of the first instruction in the transactional block. Dynamically, multiple threads can concurrently enter a transactional block, although that transactional block will still share the same static identifier.

High performance processors currently used in data processing systems today may be capable of "superscalar" operation and may have "pipelined" elements. Such processors may include multiple execution/processing slices that are able to operate in parallel to process multiple instructions in a single processing cycle. Each execution slice may include a register file and history buffer that includes the youngest and oldies copies, respectively, of architected register data. Each instruction that is fetched may be tagged by a multi-bit instruction tag. Once the instructions are fetched and tagged, the instructions may be executed (e.g., by an execution unit) to generate results, which are also tagged. A Results (or Writeback) Bus, one per execution slice, feeds all slices with the resultant instruction finish data. Thus, any individual history buffer generally includes one write port per Results/Writeback bus.

However, including numerous write ports on a history buffer can be expensive to implement in the circuit. For example, as the number of ports associated with the history buffer increases, the circuit area of the history buffer in the processing unit can grow rapidly. This, in turn, creates a compromise on the number of history buffer entries that can be supported in a given circuit area. For example, smaller history buffers generally fill up faster and can impact performance, stalling the dispatch of new instructions until older instructions are retired and free up history buffer entries. On the other hand, larger history buffers are generally expensive to implement and lead to larger circuit size. Further, the size of the history buffer can also be affected by transactional memory operations in the processing unit.

SUMMARY

One embodiment presented herein includes a method for using a multi-level history buffer for managing speculative transactions in a processing unit. The method generally includes after dispatching a first instruction indicating start of the speculative transaction, marking one or more register file (RF) entries as pre-transaction memory (PTM). The method also includes after dispatching a second instruction targeting at least one of the marked RF entries, moving data from the at least one marked RF entry targeted by the second instruction to an entry of a first level of the HB and marking the first level HB entry as PTM. The method further includes upon detecting a write back to the first level HB entry, moving data from the first level HB entry to an entry of a second level of the HB and marking the second level HB entry as PTM. The method further yet includes upon determining that the second level HB entry has been completed, moving data from the second level HB entry to an entry of a third level of the HB, wherein each entry in the third level HB is marked as PTM.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

BRIEF DESCRIPTION OF THE SEVERAL VIEWS OF THE DRAWINGS

FIG. 5 illustrates an example of data movement between different levels of the multi-level history buffer, according to one embodiment.

FIG. 6A-6B illustrate examples of a flush operation for a multi-level history buffer, according to one embodiment.

DETAILED DESCRIPTION

Figure 1:
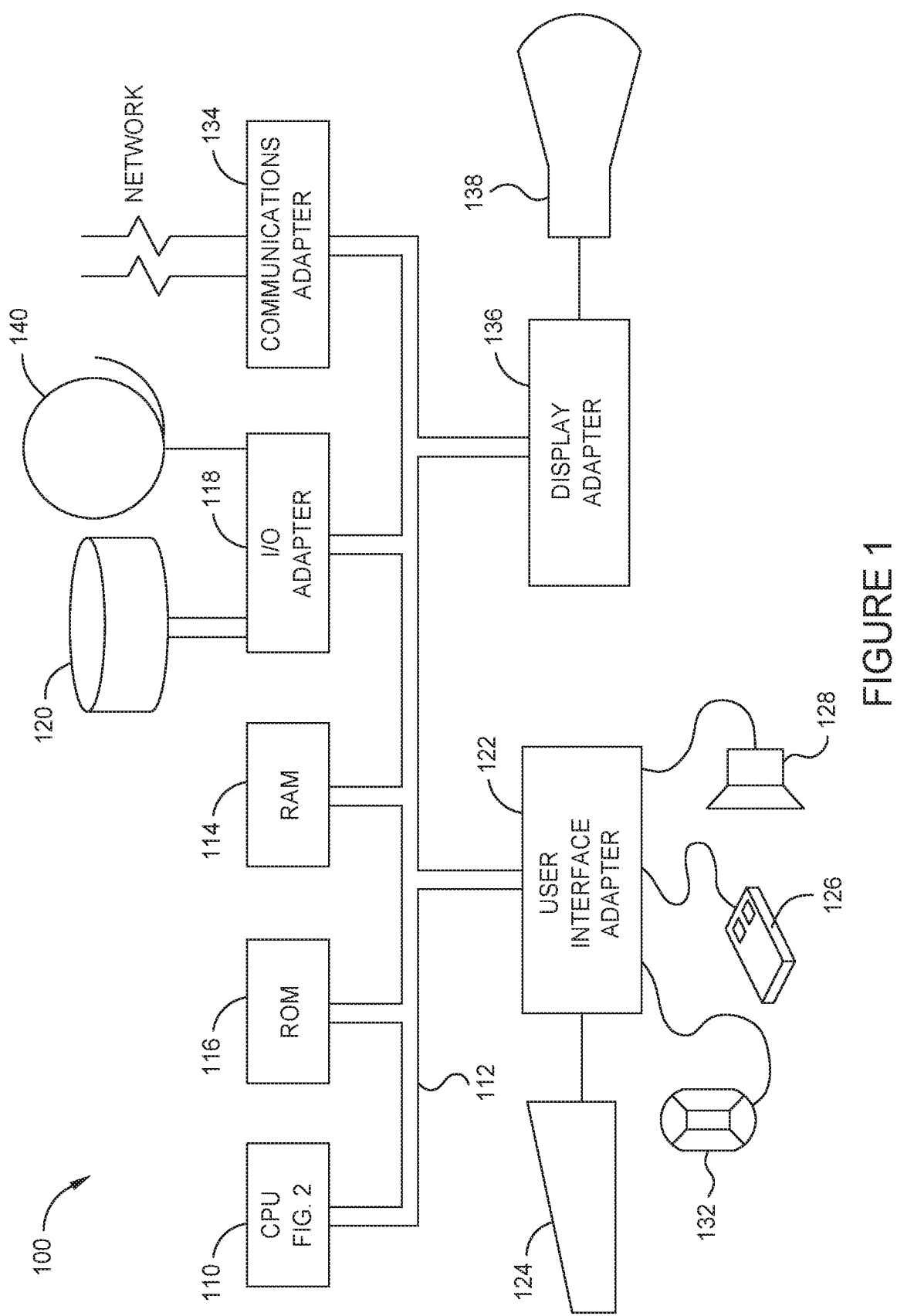
FIG. 1 illustrates an example of a data processing system configured to use one or more multi-level history buffers for transactional memory, according to one embodiment.

Embodiments described herein disclose a multi-level history buffer (HB) for transactional memory (e.g., speculative transactions) in a processing unit.

In some cases, a processing unit may use a split HB design to overcome the limitations associated with a single HB. In a split HB design (e.g., with two levels), a smaller first level (L1) HB may include multiple write ports for sinking the multiple write back busses (e.g., one write port per results/write back bus). The L1 HB can move an entry to a larger second level (L2) HB after the valid data for the L1 HB entry has been written back by the write back bus. The write back ITAG compares occur on the fewer number of entries in the L1 HB. The L2 HB may have a greater number of entries than the L1 HB. However, the L2 HB generally includes a fewer number of write ports (compared to the L1 HB), reducing the circuit size of the L2 HB. For example, in one embodiment, the number of write ports included in the L2 HB may be equal to the number of entries that are moved from the L1 HB to the L2 HB in any given cycle.

Compared to a single full HB, the split-level HB can minimize stalls caused by a single HB. In addition, silicon usage is reduced for the total number of HB entries across two levels when compared to a single HB structure. In some cases, however, the L2 HB can still be significantly large in a processing unit that supports transactional memory. For example, since transactional memory generally takes a long time to execute, the L2 HB can be filled up with a large number of pre-transactional memory states, reducing performance. That is, the pre-transactional data generally has to stay in the L2 HB until the Tend instruction is completed with a pass/fail indication. Thus, the entry in the L2 HB associated with pre-transactional memory can stay around even after the entry (e.g., logical register) has been completed.

Accordingly, embodiments presented herein provide a multi-level HB (e.g., with three levels) for transactional memory. The multi-level HB includes a first level (L1) HB, a second level (L2) HB, and a third level (L3) HB. The L1 and L2 HBs may provide support for main line execution of instructions in the processing unit. The L1 HB may have support for write back, flush and completion operations. The L2 HB may not have support for write back operations, but may have support for flush and completion operations. In one embodiment, the size of the L2 HB can be just large enough to support in-flight execution while not in transactional memory (TM) mode. The L3 HB can be used to support transactional memory. For example, as described below, the L3 HB can include all the pre-transactional memory states after completion while the processing unit is executing a speculative transaction. By using a third L3 HB to store completed pre-transactional memory data, the L3 HB does not have to support write back, flush and/or completion operations. In this manner, the L3 HB described herein can lead to a smaller L1 HB and L2 HB, which saves silicon and reduces power usage in the processing unit (e.g., as the L1 HB and L2 HB can be tuned for performance).

In one embodiment, a processing unit may dispatch a first instruction (e.g., Tbegin) that indicates a start of a speculative transaction in the processing unit. Once the first instruction is dispatched, the processing unit can mark all logical registers (LREGs) in the register file with a pre-TM bit to indicate that the LREGs are dispatched before the speculative transaction. When a new instruction is dispatched, the pre-TM entry is evicted from the register file and written into the L1 HB, along with the associated pre-TM bit. When an entry in the L1 HB is written back by an execution unit (in the processing unit), that entry can move to the L2 HB along with the associated pre-TM bit. The L2 HB may not have any write back write ports. The L2 HB, may keep the data until the evictor of the LREG is completed. Thus, flush and completion compares may be performed on entries in the L2 HB and the L2 HB may include logic to handle flush roll-back and completion deallocation.

Typically, however, when an entry in the L2 HB with a pre-TM bit set is completed (e.g., both the instruction tag (ITAG) associated with the instruction in the entry and that entry's evictor ITAG are completed), the entry cannot be flushed out since it may be needed in the event the speculative transaction fails or is aborted. As noted above, however, accommodating pre-TM data in the L2 HB can lead to a significantly large size for the L2 HB, which can be cost-prohibitive and inefficient to implement. Accordingly, embodiments herein use an additional L3 HB to store completed pre-TM data. In one embodiment, when the processing unit is executing a TM code, and the pre-TM states (in the L2 EIB) are completed and removed from the completion table, the processing unit can move the pre-TM data from the L2 HB to the L3 HB. Each entry in the L3 HB may include a pre-TM bit and the associated data. An entry in the L3 HB may not have flush or completion logic.

In one embodiment, when a pre-TM entry is moved from the L2 HB to the L3 HB, the LREG of that entry can be used as an index address to write into the L3 HB. After the entry is written, its pre-TM bit can be set to 1 to indicate that the LREG is a pre-TM entry to be restored if the speculative transaction fails. For example, if the processing unit determines that the speculative transaction failed (e.g., Tend completed with a fail indicator), then all entries in the L3 HB with a pre-TM bit set to 1 can be restored to the register file. On the other hand, if the processing unit determines that the speculative transaction passed (e.g., Tend completed with a pass indicator), all entries in the L3 HB with a pre-TM bit set to 1 can be cleared out (or invalidated) to indicate that the data associated with the entries do not need to be preserved for restoration. In this manner, the three level HB disclosed herein can significantly increase the efficiency and performance of the processing unit when executing speculative transactions (e.g., relative to a single HB or two level HB).

Note, to clearly point out novel features of the present invention, the following discussion omits or only briefly describes conventional features of information processing systems which are apparent to those skilled in the art. It is assumed that those skilled in the art are familiar with the general architecture of processors, and in particular with processors which operate in an in-order dispatch, out-of-order execution, in-order completion fashion. It may be noted that a numbered element is numbered according to the figure in which the element is introduced, and is referred to by that number throughout succeeding figures.

FIG. 1 illustrates an example of a data processing system 100 that may include one or more multi-level HBs, according to one embodiment. The system has a central processing unit (CPU) 110 such as a PowerPC microprocessor ("PowerPC" is a trademark of IBM Corporation). The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and operates according to reduced instruction set computing ("RISC") techniques. The CPU 110 processes according to processor cycles, synchronized, in some aspects, to an internal clock (not shown).

Figure 2:
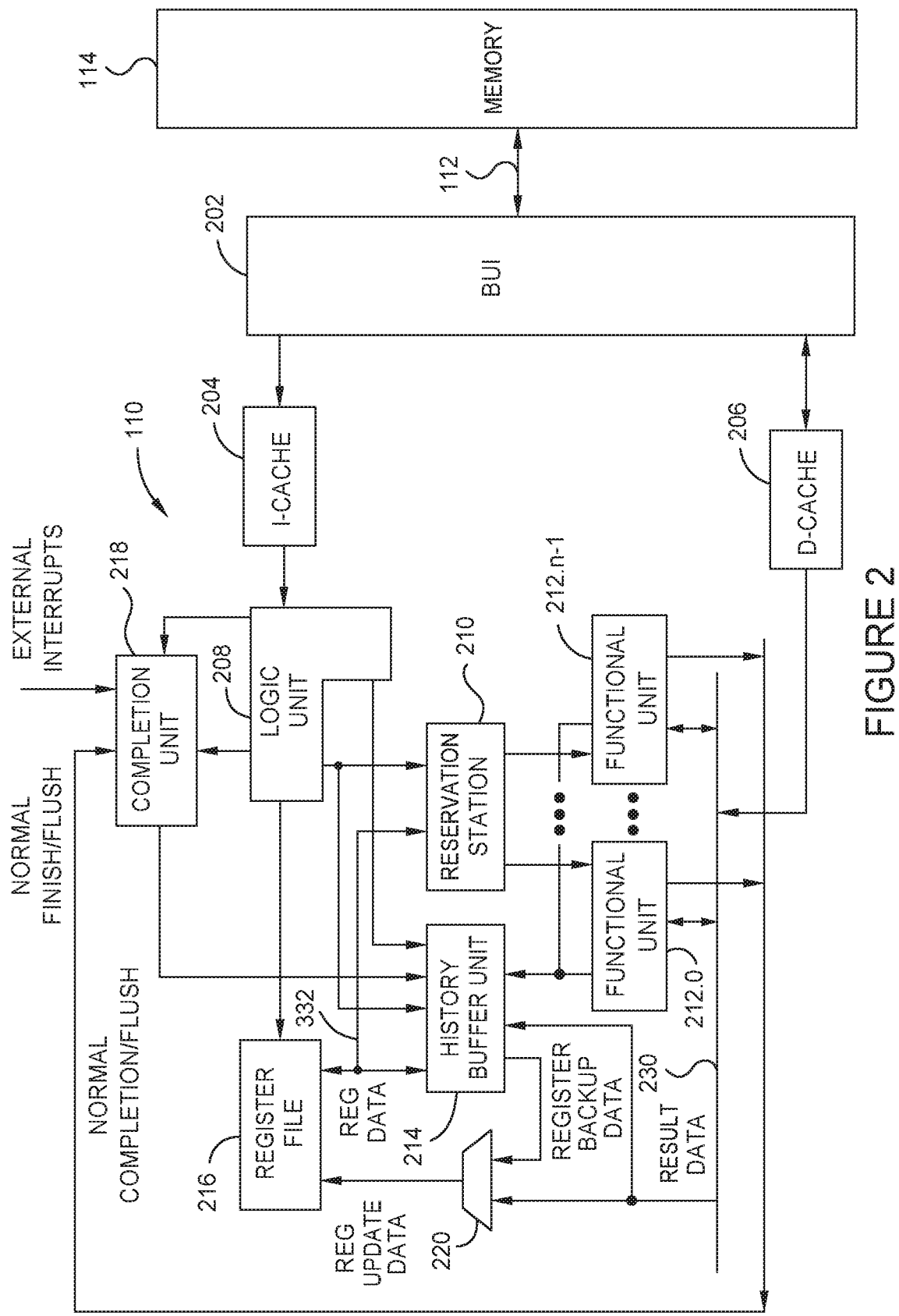
FIG. 2 illustrates a block diagram of a processor that includes one or more multi-level history buffers for transactional memory, according to one embodiment.

FIG. 2 illustrates a block diagram of a processor 110 that may include one or more multi-level HBs, according to one embodiment. Processor 110 has a bus interface unit 202 coupled to the bus 112 for controlling transfers of data and instructions between memory, such as random access memory 114, and caches, e.g. instruction cache (I-Cache) 204 and data cache (D-Cache) 206.

Instructions may be processed in the processor 110 in a sequence of logical, pipelined stages. However, it should be understood that the functions of these stages, may be merged together, so that this particular division of stages should not be taken as a limitation, unless such a limitation is indicated in the claims herein. Indeed, some of the previously described stages are indicated as a single logic unit 208 in FIG. 2 for the sake of simplicity of understanding and because each distinction between stages is not necessarily central to the present invention.

Logic unit 208 in FIG. 2 includes fetch, branch processing, instruction buffer, decode and dispatch units. The unit 208 fetches instructions from instruction cache 204 into the instruction buffer, either based on a normal sequence of the instructions or, in the case of a sequence having a conditional branch instruction, a predicted sequence, the predicted sequence being in accordance with addresses selected by the branch processing unit. The logic unit 208 also decodes the instructions and dispatches them to an appropriate functional unit (e.g., execution unit) 212.0, 212.1, . . . 212.n-1 via reservation station 210. In executing the instructions, the units 212 input and output information to registers (shown collectively as register file (RF) 216). Register file 216 may include an array of processor registers (e.g., general purpose registers (GPRs), vector and scalar registers (VSRs), etc.). Register file 216 can include a number of RF entries or storage locations, each RF entry storing a 64 bit double word and control bits. In some cases, an RF entry may store 128 bit data. In one embodiment, register file 216 is accessed and indexed by logical register (LREG) identifiers, e.g., r0, r1, . . . , rn. Each RF entry holds the most recent (or youngest) fetched instruction and its ITAG. In some cases, each RF entry may also hold the most recent (or youngest) target result data corresponding to a LREG for providing the result data to a next operation. A new dispatch target replaces (or evicts) a current RF entry. In such cases, the current RF entry can be moved to the history buffer (HB) logic unit 214.

The functional units 212 signal the completion unit 218 upon execution of instructions and the completion unit 218 retires the instructions, which includes notifying HB logic unit 214. As will be explained in detail later, the HB logic 214 may save a processor state before, for example, an interruptible instruction, so that if an interrupt occurs, HB control logic may recover the processor state to the interrupt point by restoring the content of registers. HB logic 214 may use a multi-level HB for speculative transactions (e.g., transactional memory) in processor 110.

Functional units 212 also assert results on one or more result buses (e.g. write back buses) 230 so that the results may be written by one or more write ports 220 to the registers in the register file 216. In addition to notifying the HB logic unit 214 about retired instructions, the completion unit 218 or logic unit 208 may also notify the HB unit 214 about exception conditions and mis-predicted branches for which instructions should be discarded prior to completion and for which the HB unit 214 should recover a state of the processor 110 as will be further described below. The HB logic unit 214 may also receive other information about dispatched instructions from the logic unit 208, the register file 216, and one or more functional units 212.

In some embodiments, a CPU 110 may have multiple execution/processing slices with each slice having one or more of the units shown in FIG. 2. For example, each processing slice may have its own logic unit 208, register file 216, history buffer unit 214, reservation station 210 and functional/execution units 212. A CPU 110 having the multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Each processing slice may be an independent processor (e.g., processor 110) and may execute instructions independently of other processing slices in the multi-slice processor.

In some embodiments, when a microprocessor (e.g., CPU 110) is executing a speculative Transactional Memory (TM) instruction, all pre-TM register states must be saved. When the TM instruction has successfully completed (i.e., passed), all these saved states may be discarded. However, if the speculative transaction fails, all pre-TM registers may be restored before execution may resume. In some cases, a TM mode may include executing a speculative transaction corresponding to a single processing thread. A speculative transaction typically includes a sequential block of software codes. In one embodiment, a transaction may be committed only if the transaction passes (e.g., does not conflict with other transactions corresponding to other threads). In some embodiments, a speculative transaction may be executed in a particular slice of a multi-slice processor 300. Also, two or more speculative transactions may be executed in parallel by two or more processing slices of the multi-slice processor, one transaction per slice. The transactions are speculative since the system does not know if the data generated by the transaction will actually result in an architected state or not. As noted above, if a transaction fails, the system may have to be restored back to the pre-TM state.

In some cases, pre-TM states (e.g. data values of registers evicted out by instructions in the TM mode) may be stored in the history buffers, and restored as and when required. In certain aspects, the TM mode may include speculative branch executions, rollbacks and completions within the transaction of the TM mode, yielding speculative architected states of one or more registers that are true at least until the TM mode is running (i.e., the transaction is active). However, the speculative architected states of the registers may be rolled back to pre-TM states once the TM mode is completed, e.g. TM mode fails or is aborted. Further, there may be one or more nested transactions within a transaction thread.

Figure 3:
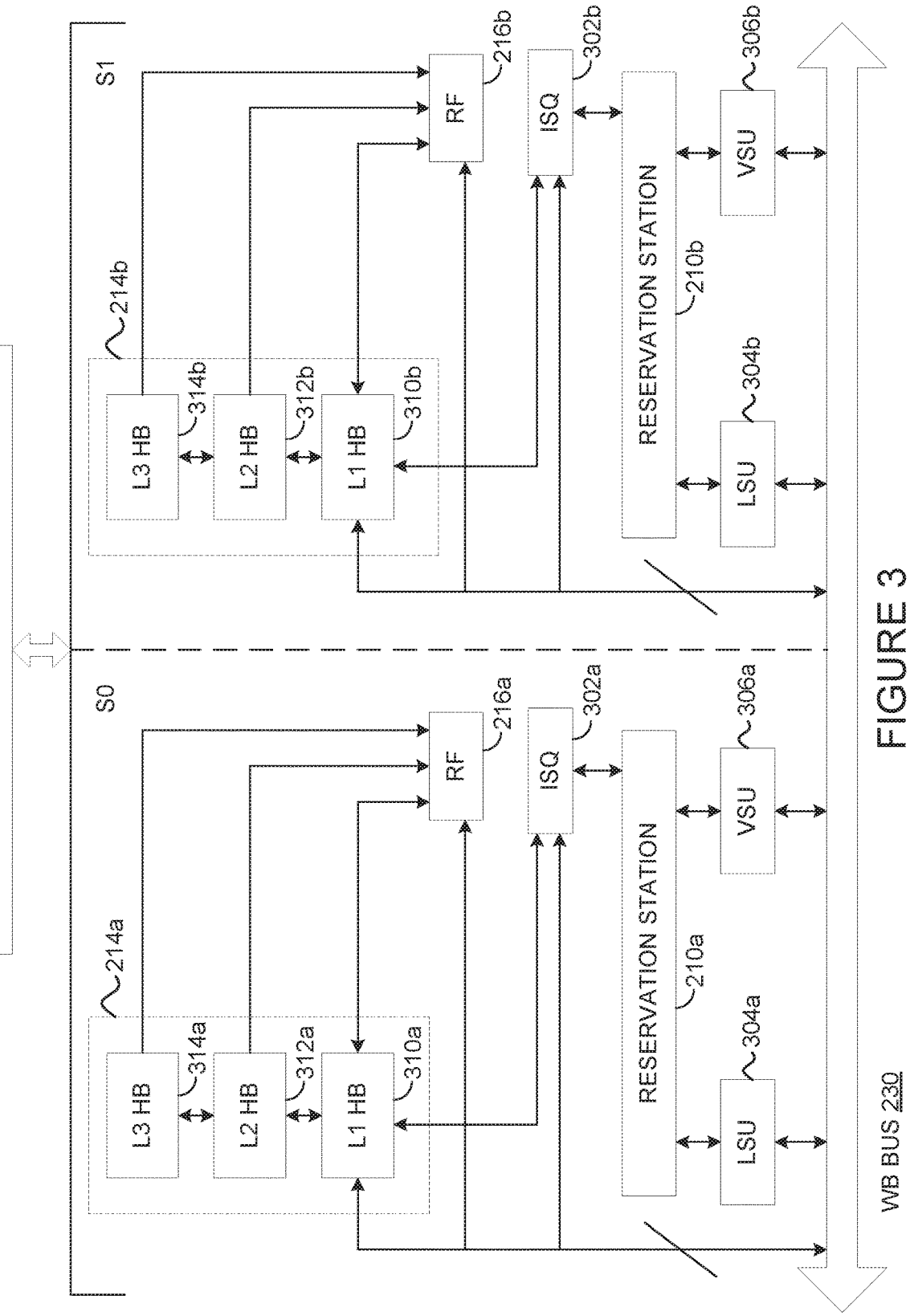
FIG. 3 illustrates a multi-slice processor with one or more multi-level history buffers, according to one embodiment.

FIG. 3 illustrates a multi-slice processor 300 that may include one or more multi-level HBs for transactional memory, according to one embodiment. It may be noted that FIG. 3 only shows portions/components of the multi-slice processor 300 that are relevant for this discussion. As shown in FIG. 3, the multi-slice processor 300 includes two processing slices Slice 0 and Slice 1. Each of the Slices 0 and 1 includes an issue queue (ISQ) (302*a* and 302*b*), a reservation station (210*a* and 210*b*), execution units including a load store unit (LSU) (304*a* and 304*b*), a vector scalar unit (VSU) (306*a* and 306*b*), a register file (RF) (216*a* and 216*b*), and a history buffer (HB) unit (214*a* and 214*b*). As shown, logic unit 208 may perform instruction fetch and dispatch for the multi-slice processor. In one embodiment, the slices 0 and 1 may share one register file 216 having an array of GPRs and/or VSRs. In one embodiment, slices may share more than one register file 216, which is configured as a register bank. In one embodiment, slices 0 and 1 may use register file 216 and other components therein for register renaming.

The reservation station may include a bank of register entries. The ISQ 302 can hold a set of instructions and the reservation station can accumulate data for the instruction inputs. When an instruction is dispatched, the ISQ 302 may allocate an RF entry for the instruction. The source RF entries required as input for the instruction are looked up and passed on to the reservation station. When all source data accumulates for the instruction, the reservation station passes it on to one or more execution units designated for execution of the instruction. In an aspect, the reservation station is part of the ISQ 302. Each of the LSUs 304 and VSUs 306 may make result data available on the write back buses 230 for writing into an RF entry or HB entry. In some embodiments, each of the LSUs 304 and VSUs 306 may have a corresponding WB bus 230.

It may be noted that the two slices are shown for ease of illustration and discussion only, and that multi-slice processor 300 may include more than two slices with each slice having all the components discussed above for each of the slices 0 and 1. Further, the processing slices may be grouped into super slices (SS), with each super slice including a pair of processing slices. For example, a multi-slice processor may include two super slices SS0 and SS1, with SS0 including slices 0 and 1, and SS1 including slices 2 and 3. In some cases, one register file 216 may be allocated per super slice and shared by the processing slices of the super slice.

In some embodiments, the slices 0 and 1 of the multi-slice processor 300 may be configured to simultaneously execute independent threads (e.g., one thread per slice) in a simultaneous multi-threading mode (SMT). Thus, multiple threads may be simultaneously executed by the multi-slice processor 300. In an aspect, a super slice may act as a thread boundary. For example, in a multi thread mode, threads T0 and T1 may execute in SS0 and threads T2 and T3 may execute in SS1. Further, in a single thread (ST) mode, instructions associated with a single thread may be executed simultaneously by the multiple processing slices of at least one super slice, for example, one instruction per slice simultaneously in one processing cycle. The simultaneous processing in the multiple slices may considerably increase processing speed of the multi-slice processor 300.

As noted above, the HB unit 214 may save a processor state before, for example, an instruction indicating start of a speculative transaction, so that if the speculative transaction fails, HB control logic may recover the processor state prior to the start of the speculative transaction by restoring the content of registers. As shown, HB unit 214 includes three levels of history buffers, a L1 HB 310, L2 HB 312 and L3 HB 314. Each level of HB may be implemented as a separate circuit in the processor 110. The L1 HB 310 may include all the write ports (i.e., for writing to the L1 HB 310) necessary to sink the multiple write back busses. For example, in one embodiment, the L1 HB 310 may include ten write ports, eight of which are from the eight write back busses of WB Bus 230, and two of which are from the register file 216. To reduce the number of ITAG compares that have to be done on the L1 HB 310, the L1 HB 310 may have a fewer number of entries compared to the L2 HB 312 and L3 HB 314. For example, in one embodiment, the L1 HB 310 may include 16 entries.

In one embodiment, when a new instruction (e.g., second instruction) (targeting one of the LREGs in the register file 216) is dispatched, the new instruction may evict the current RF entry associated with the previous instruction (e.g., first instruction), and the current RF entry may be moved to the L1 HB 310. Each entry in the L1 HB 310, therefore, may include an ITAG of the previous instruction, the previous instruction, the evictor ITAG of the new instruction and one or more control bits (e.g., such as a pre-TM bit). In some embodiments, the L1 HB entry may also include result data for the first instruction (e.g., from the write back bus 230).

Compared to the L1 HB 310, the L2 HB 312 may have a greater number of entries. For example, in one embodiment, the L2 HB 312 may include 32 entries, 64 entries, etc. At the same time, however, the L2 HB 312 may include a fewer number of write ports compared to the L1 HB 310. For example, in one embodiment, the L2 HB 312 may include a single write port (used for writing a single entry from the L1 HB 310 to the L2 HB 312 in any given cycle). With a fewer number of write ports, the L2 HB 312 may occupy a same or smaller circuit area than the L1 HB 310 with more available entries. In general, however, the L2 HB 312 can be large enough to support the desired amount of in-flight execution in the processor 110 while not in TM mode. For example, the number of write ports in L2 HB 312 can be equal to the desired number of entries to move from the L1 HB 310 to the L2 HB 312 in a given cycle. In one embodiment, when valid data has been written back to an entry in the L1 HB 310, the L1 HB entry can be moved to the L2 HB 312. If the entry is associated with pre-transactional memory, the L2 HB entry may include a pre-TM bit set to 1.

Generally, the L1 HB 310 and L2 HB 312 may independently perform completion and/or flush operations. Typically, when an instruction has finished executing, it may be considered completed and may be retired. Completion of an instruction indicates that there may be no further exceptions requiring restore (such that depositing the results of the instruction will not violate the program order), and the state of the processor (e.g., defined by one or more RF entries) becomes the architected state. Thus, in an architected state any older result corresponding to an RF entry stored in an HB level is not needed. In an aspect, an HB entry needs to remain valid in the HB until its evictor completes, because there may be a flush point between the HB entry and the evictor in the RF, needing possible restore. Thus, until the evictor completes and the state of the evictor RF entry becomes the architected state, the previous HB entry needs to remain valid. To determine whether an instruction in an entry of the L1 HB 310 and/or L2 HB 312 is "complete," both the L1 HB 310 and L2 HB 312 may independently compare the completion ITAG to the evictor ITAG in each entry. The completion ITAG may be broadcast by the completion unit 218 upon a decision that an instruction corresponding to the entry ITAG is complete. For each entry in L1 HB 310 and/or L2 HB 312, if the evictor ITAG is older than or the same age as the completion ITAG, then the entry can be considered "complete" and invalidated.

In a flush and restore operation, logic unit 208 may determine to restore one or more entries of the register file 216 with entries of the L1 HB 310 and/or L2 HB 320, and signal the L1 HB 310 and/or L2 HB 320 to perform a flush and restore operation. The logic unit 208 may send a flush ITAG to the L1 HB 310 and L2 HB 320 and the L1 HB 310 and L2 HB 320 may independently perform two different ITAG compares based on the flush ITAG. In a first ITAG compare, the flush ITAG, evictor ITAG and entry ITAG are compared. If the entry ITAG is greater/older than the flush ITAG and the flush ITAG is older than/equal to the evictor ITAG, then the entry may be marked for restoration (e.g., a restore pending (RP) bit may be set to 1 for the entry). In a second ITAG compare, the flush ITAG and entry ITAG are compared. If the flush ITAG is older/equal to the entry ITAG, then the entry can be invalidated.

As noted above, however, when the processor 110 is executing a speculative transaction and pre-TM data in the L2 HB 312 has been completed, the pre-TM data cannot be invalidated from the L2 HB 312 until the speculative transaction is completed with a pass/fail indication. Since speculative transactions, in general, take a longer time to execute, the L2 HB 312 can be filled up with a large number of pre-TM states (some of which may have already been completed), which can reduce the performance of the L2 HB 312. Accordingly, embodiments herein use a L3 HB 314 to store completed pre-TM data. Compared to the L1 HB 310 and L2 HB 312, the L3 HB 314 may include enough entries to contain data for all architected LREGs for GPR and VSR in the register file 216. Put differently, the number of entries in the L3 HB 314 may be equal to the number of entries in the register file 216. The L3 HB 314 may include a single write port (e.g., for moving an entry from the L2 HB 312 to L3 HB 314 in a cycle) and a single read port (e.g. for restoring one PTM entry to RF 216 in a cycle).

In one embodiment, when an entry in the L2 HB 312 with a pre-TM bit set to 1 is completed, the entry can be moved to the L3 HB 314 (instead of keeping the pre-TM entry in the L2 HB 312). Each entry in the L3 HB 314 may include the pre-TM bit and the associated pre-TM data. An entry may stay in the L3 HB 314 until Tend (associated with the speculative transaction) is completed with a pass/fail indication. For example, if the speculative transaction passed, then all the pre-TM data in the L3 HB 314 can be discarded. On the other hand, if the speculative transaction failed, valid L3 HB 314 entries can be read out to restore to GPR/VSR in the register file 216.

Figure 4:
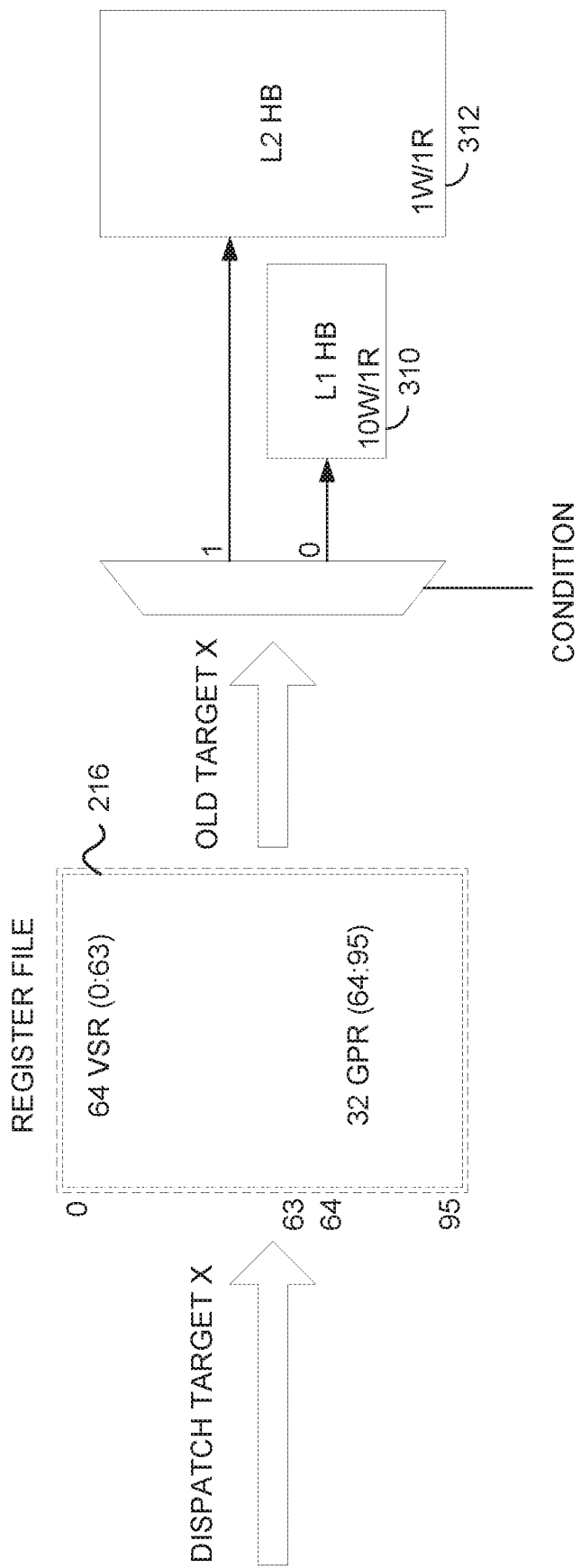
FIG. 4 illustrates an example of data movement between a register file and multi-level history buffer, according to one embodiment.

FIG. 4 illustrates an example of data movement between a register file and multi-level history buffer in a processing unit, according to one embodiment. In this embodiment, the register file 216 includes 64 VSRs and 32 GPRs, the L1 HB 310 includes ten write ports and a single read port, and the L2 HB 312 includes a single write port and single read port. However, in general, the L1 HB 310 and L2 HB 312 may include any number of write/read ports. As shown, when an instruction targeting register X is dispatched and the register file 216 contains interruptible data at LREG X, the interruptible data may be moved to an entry of the L1 HB 310. In some cases, based on a predefined condition, the interruptible data can be moved directly to an entry of the L2 HB 312. For example, in one embodiment, if the data is valid and if the L1 HB 310 is not trying to move an entry previously written by the RF 216 to the L2 HB 312, then a dispatch checkpoint write could go straight from the RF 216 to L2 HB 312.

FIG. 5 illustrates an example of data movement between different levels of the multi-level history buffer, according to one embodiment. As shown, result data for an entry in L1 HB 310 may be written into the L1 HB 310, and a control bit (e.g., data_v bit) may be set to indicate whether the result data is valid. For the move from L1 HB 310 to L2 HB 312, in every cycle, the processing unit may find the next entry in L1 HB 310 with data_v=1, read the entry out of L1 HB 310, write the entry into L2 HB 312, and invalidate the L1 HB 310 entry. For the move from L2 HB 312 to L3 HB 314, the processing unit can find the next entry in L2 HB 312 with pre_TM=1 and completed (e.g., its evictor ITAG is already completed), read the entry out of L2 HB 312, write the entry into L3 HB 314 using the index of the LREG associated with the entry, set pre_TM=1 in the L3 HB 314, and invalidate the L2 HB entry.

FIGS. 6A and 6B illustrate an example of a flush operation for a multi-level history buffer, according to one embodiment. As shown in FIG. 6A, once the logic unit 208 signals a flush ITAG, both the L1 HB 310 and L2 HB 312 independently compare the flush ITAG to each entry's ITAG and evictor ITAG. During this flush cycle, if the entry's ITAG is older than the flush ITAG and the flush ITAG is older/equal to the evictor ITAG, then the entry is marked for restore. If the flush ITAG is older/equal to the entry's ITAG, then the entry is invalidated.

As shown in FIG. 6B, in every cycle after flush, the next entry (in L1 HB 310 and L2 HB 312) marked for restore with "Restore Pending" (RP)=1 is identified, read, and multiplexed with the other level. In one embodiment, a priority selector may be used to select which of the L1/L2 HB is used to restore the register in the RF 216. In some cases, a feedback mechanism can be used to retain the entry of the other HB level that is not selected. Once the entry is selected, the entry is invalided (e.g., from the selected HB level) and written to the RF 216.

Figure 7:
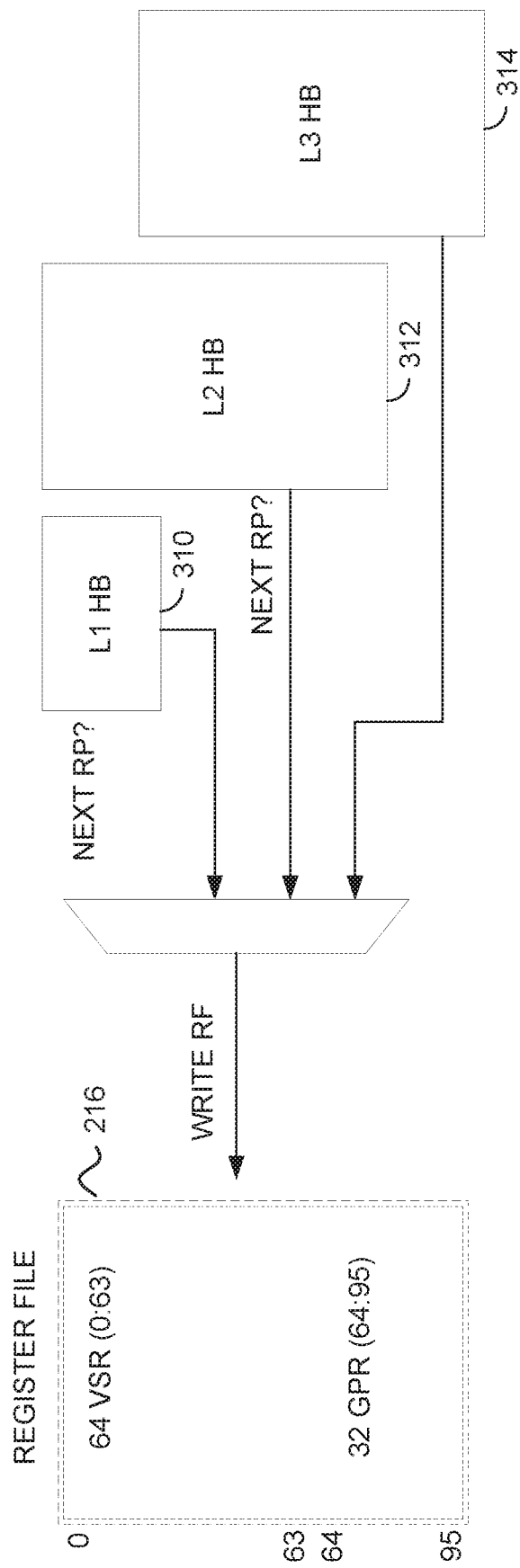
FIG. 7 illustrates an example of data movement for a multi-level history buffer in the event of a restore operation for transactional memory, according to one embodiment.

FIG. 7 illustrates an example of data movement for a multi-level history buffer in the event of a restore operation for transactional memory, according to one embodiment. If the speculative transaction failed (e.g., Tend completed with a fail indicator), then all entries in the L3 HB 314 with pre_TM=1 will have to be restored to the register file 216. A simple state machine (e.g., as opposed to flush logic) can be used to read entries with pre_TM=1 to restore to the register file 216. The entry location may be the LREG number than can be used as a write address to the register in the register file 216. After an entry is read out of the L3 HB 214 to restore, the pre_TM bit for that entry can be set to 0 to indicate that the data in the L3 HB 214 is no longer needed. As shown in FIG. 7, for example, in every cycle after a TM fail, both L2 and L3 HBs can find the next entry with pre_TM=1, read the entry, multiplex with the other level, invalidate the selected entry, and write the register file 216. The register file entry can also be unmarked as PTM. In some embodiments, a feedback mechanism can be used to retain the entry of the other HB level that is not selected.

Figure 8:
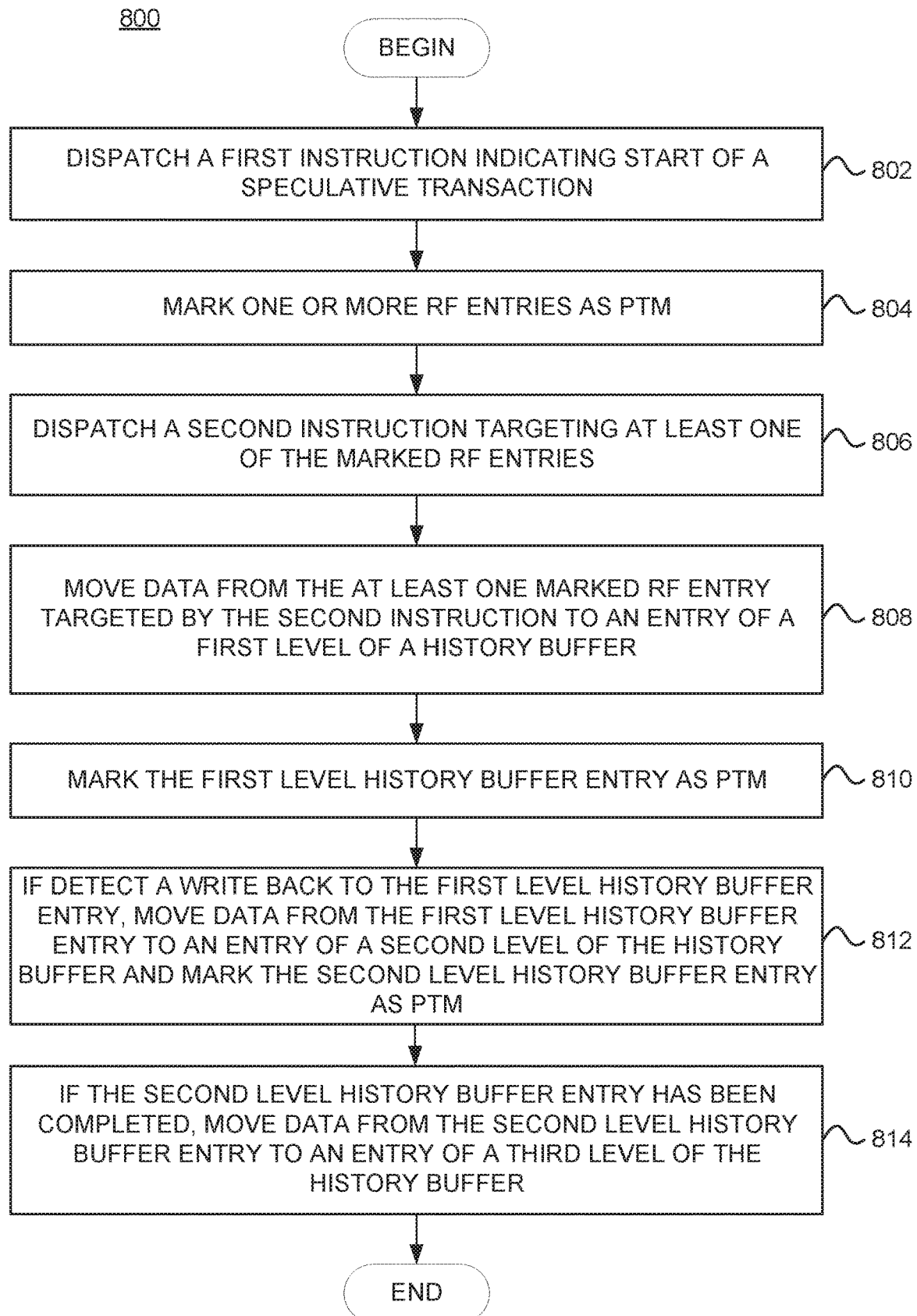
FIG. 8 is a flow chart illustrating a method for using a multi-level history buffer for a speculative transaction in a processing unit, according to one embodiment.

FIG. 8 is a flow chart illustrating a method 800 for using a multi-level history buffer for a speculative transaction in a processing unit, according to one embodiment. The method 800 can be performed by a processing unit (e.g., CPU 110) or one or more components of the processing unit. As shown, the method 800 begins at block 802, where the processing unit dispatches a first instruction indicating start of a speculative transactional memory (TM) transaction. At block 804, the processing unit marks one or more entries of a register file (RF) as pre-transactional memory (PTM). At block 806, the processing unit dispatches a second instruction targeting at least one of the marked RF entries.

At block 808, the processing unit moves data from the at least one marked RF entry targeted by the second instruction to an entry of a first level of a HB. At block 810, the processing unit marks the first level HB entry as PTM. At 812, if the processing unit detects a write back to the first level HB entry, the processing unit moves data from the first level HB entry to an entry of a second level of the HB, and marks the second level HB entry as PTM. At 814, if the processing unit determines that the second level HB entry has been completed, the processing unit moves data from the second level HB entry to an entry of a third level of the HB. The method then ends.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for using a multi-level history buffer (HB) for a speculative transaction in a processing unit, comprising:
    after dispatching a first instruction indicating a start of the speculative transaction, marking one or more register file (RF) entries as pre-transaction memory (PTM);
    after dispatching a second instruction targeting at least one of the marked RF entries, moving data from the at least one marked RF entry targeted by the second instruction to an entry of a first level of the HB and marking the first level HB entry as PTM;
    upon detecting a write back to the first level HB entry, moving data from the first level HB entry to an entry of a second level of the HB and marking the second level HB entry as PTM; and
    upon determining that the second level HB entry has been completed and is marked as PTM, moving data from the second level HB entry to an entry of a third level of the HB, wherein:
        determining that the second level HB entry has been completed comprises determining that an evictor instruction tag associated with the second level HB entry is older than or has a same age as a completion instruction tag associated with the second level HB entry; and
        each entry in the third level HB is marked as PTM.

2. The method of claim 1, further comprising upon detecting that the speculative transaction is aborted:
    restoring data from the third level HB entry to the at least one marked RF entry;
    invalidating the data from the third level HB entry; and
    unmarking the at least one marked RF entry.

3. The method of claim 1, further comprising upon detecting that the speculative transaction has passed, invalidating the data from the third level HB entry.

4. The method of claim 1, further comprising performing at least one of a flush operation and a completion operation for entries of the first level HB and the second level HB.

5. The method of claim 1, further comprising identifying the third level HB entry based on an index of the at least one marked RF entry.

6. The method of claim 5, wherein moving the data from the second level HB entry to the third level HB entry comprises writing the data from the second level HB entry to the third level HB entry that has a same index as the at least one marked RF entry.

7. The method of claim 1, wherein a number of entries of the third level HB is equal to a number of entries of the RF.

8. The method of claim 1, wherein a number of entries in the first level of the HB is less than a number of entries in each of the second level of the HB and the third level of the HB.

9. A system, comprising:
at least one processor comprising a register file (RF) and a multi-level history buffer (HB) comprising a first level, a second level different from the first level, and a third level different from the first and second levels; and
a memory storing a program, which, when executed on the at least one processor, performs an operation for a speculative transaction, the operation comprising:
after dispatching a first instruction indicating a start of the speculative transaction, marking one or more entries of the RF as pre-transaction memory (PTM);
after dispatching a second instruction targeting at least one of the marked RF entries, moving data from the at least one marked RF entry targeted by the second instruction to an entry of the first level of the HB and marking the first level HB entry as PTM;
upon detecting a write back to the first level HB entry, moving data from the first level HB entry to an entry of the second level of the HB and marking the second level HB entry as PTM; and
upon determining that the second level HB entry has been completed and is marked as PTM, moving data from the second level HB entry to an entry of the third level of the HB, wherein:
determining that the second level HB entry has been completed comprises determining that an evictor instruction tag associated with the second level HB entry is older than or has a same age as a completion instruction tag associated with the second level HB entry; and
each entry in the third level of the HB is marked as PTM.

10. The system of claim 9, the operation further comprising upon detecting that the speculative transaction is aborted:
restoring data from the third level HB entry to the at least one marked RF entry;
invalidating the data from the third level HB entry; and
unmarking the at least one marked RF entry.

11. The system of claim 9, the operation further comprising upon detecting that the speculative transaction has passed, invalidating the data from the third level HB entry.

12. The system of claim 9, the operation further comprising performing at least one of a flush operation and a completion operation for entries of the first level of the HB and the second level of the HB.

13. The system of claim 9, the operation further comprising identifying the third level HB entry based on an index of the at least one marked RF entry.

14. The system of claim 13, wherein moving the data from the second level HB entry to the third level HB entry comprises writing the data from the second level HB entry to the third level HB entry that has a same index as the at least one marked RF entry.

15. The system of claim 9, wherein a number of entries of the third level of the HB is equal to a number of entries of the RF.

16. The system of claim 9, wherein a number of entries in the first level of the HB is less than a number of entries in each of the second level of the HB and the third level of the HB.

17. A computer program product, the computer program product comprising:
a computer-readable storage medium having computer-readable program code embodied therewith, the computer-readable program code executable by one or more computer processors to perform an operation for using a multi-level history buffer (HB) for a speculative transaction in a processing unit, the operation comprising:
after dispatching a first instruction indicating a start of the speculative transaction, marking one or more register file (RF) entries as pre-transaction memory (PTM);
after dispatching a second instruction targeting at least one of the marked RF entries, moving data from the at least one marked RF entry targeted by the second instruction to an entry of a first level of the HB and marking the first level HB entry as PTM;
upon detecting a write back to the first level HB entry, moving data from the first level HB entry to an entry of a second level of the HB and marking the second level HB entry as PTM; and
upon determining that the second level HB entry has been completed and is marked as PTM, moving data from the second level HB entry to an entry of a third level of the HB, wherein:
determining that the second level HB entry has been completed comprises determining that an evictor instruction tag associated with the second level HB entry is older than or has a same age as a completion instruction tag associated with the second level HB entry; and
each entry in the third level HB is marked as PTM.

18. The computer program product of claim 17, the operation further comprising upon detecting that the speculative transaction is aborted:
restoring data from the third level HB entry to the at least one marked RF entry;
invalidating the data from the third level HB entry; and
unmarking the at least one marked RF entry.

19. The computer program product of claim 17, the operation further comprising upon detecting that the speculative transaction has passed, invalidating the data from the third level HB entry.

20. The computer program product of claim 17, the operation further comprising performing at least one of a flush operation and a completion operation for entries of the first level of the HB and the second level of the HB.

* * * * *